(12) United States Patent
Bergman et al.

(10) Patent No.: US 8,419,104 B2
(45) Date of Patent: Apr. 16, 2013

(54) MULTIPLE USE ALL TERRAIN VEHICLE

(75) Inventors: James Bergman, Oslo, MN (US); Larry Holter, Alvarado, MN (US); Rick Nelson, Oslo, MN (US); Dave Paschke, East Grand Forks, MN (US)

(73) Assignee: Beamco, Inc., Oslo, MN (US)

( * ) Notice: Subject to any disclaimer, the term of this patent is extended or adjusted under 35 U.S.C. 154(b) by 0 days.

(21) Appl. No.: 13/334,483

(22) Filed: Dec. 22, 2011

(65) Prior Publication Data
US 2012/0090908 A1 Apr. 19, 2012

Related U.S. Application Data

(62) Division of application No. 12/649,842, filed on Dec. 30, 2009, now Pat. No. 8,109,556.

(60) Provisional application No. 61/203,905, filed on Dec. 30, 2008.

(51) Int. Cl.
*B60N 3/06* (2006.01)
(52) U.S. Cl.
USPC .......................................... 296/75; 180/90.6
(58) Field of Classification Search ............ 296/75, 296/198; 180/210, 219, 312, 90.6; 297/68, 297/423.26, 89; 280/250.1, 291, 642, 647, 280/650, 154
See application file for complete search history.

(56) References Cited

U.S. PATENT DOCUMENTS

| | | | |
|---|---|---|---|
| 4,591,178 A | 5/1986 | Mortvedt et al. | |
| 5,893,424 A | 4/1999 | Hisada | |
| 6,042,148 A * | 3/2000 | Howell | 280/827 |
| 6,092,877 A * | 7/2000 | Rasidescu et al. | 303/9.61 |
| 6,270,106 B1 * | 8/2001 | Maki et al. | 280/291 |
| 6,296,163 B1 | 10/2001 | Kitao et al. | |
| 6,340,186 B2 * | 1/2002 | Johnson et al. | 293/120 |
| 6,390,218 B1 * | 5/2002 | Yao | 180/90.6 |
| 6,502,863 B1 | 1/2003 | Takahashi et al. | |
| 6,644,693 B2 * | 11/2003 | Michisaka et al. | 280/835 |
| 6,659,566 B2 * | 12/2003 | Bombardier | 298/22 R |
| 6,682,085 B2 | 1/2004 | Furuhashi et al. | |
| 6,968,917 B2 * | 11/2005 | Rondeau et al. | 180/89.1 |
| 6,981,695 B1 * | 1/2006 | Hedlund et al. | 254/323 |
| 7,086,691 B2 | 8/2006 | Kennedy et al. | |
| 7,121,371 B2 * | 10/2006 | Rondeau et al. | 180/89.1 |
| 7,331,418 B2 * | 2/2008 | Audet | 180/312 |
| 7,377,570 B2 * | 5/2008 | Rondeau et al. | 296/65.03 |
| 7,390,046 B2 * | 6/2008 | Ostroski et al. | 296/63 |
| 7,404,568 B1 * | 7/2008 | Portelance et al. | 280/291 |
| 7,438,350 B1 * | 10/2008 | Peterson et al. | 296/191 |
| 7,451,846 B2 * | 11/2008 | Wubbolts et al. | 180/183 |
| 7,562,736 B2 * | 7/2009 | Eguchi et al. | 180/291 |

(Continued)

*Primary Examiner* — Kiran B. Patel
(74) *Attorney, Agent, or Firm* — Kinney & Lange, P.A.

(57) ABSTRACT

An all terrain vehicle with a tool less maintainable drive system, and having a seat designed to be straddled by the operator. The vehicle has a frame, a plurality of wheels attached to the frame, a steering mechanism attached at least one of the plurality of wheels, an engine mounted to the frame, and a clutch attached to the engine. The vehicle contains a system of features that can be removed without the use of tools. The system has a support attached to and extending outward from the frame, a removable footrest, a receiver attached to the removable footrest and configured to mate with the support, a locking mechanism attached to the receiver to secure the removable footrest with respect to the footrest support; and a removable clutch housing.

6 Claims, 20 Drawing Sheets

U.S. PATENT DOCUMENTS

| | | | |
|---|---|---|---|
| 7,591,503 B2 * | 9/2009 | Schroeder et al. | 296/198 |
| 7,647,996 B2 * | 1/2010 | Maltais et al. | 180/89.1 |
| 7,708,105 B1 * | 5/2010 | Berg | 180/312 |
| 7,712,557 B2 * | 5/2010 | Duceppe | 180/9.21 |
| 7,743,864 B2 * | 6/2010 | Tweet | 180/89.1 |
| 7,753,427 B2 * | 7/2010 | Yamamura et al. | 296/63 |
| 7,766,119 B2 * | 8/2010 | Yokoi et al. | 180/311 |
| 7,802,806 B2 * | 9/2010 | Danze | 280/291 |
| 7,896,421 B2 * | 3/2011 | Kosuge et al. | 296/75 |
| 7,905,803 B2 * | 3/2011 | Mochizuki et al. | 474/18 |
| 2005/0140178 A1 | 6/2005 | Kennedy et al. | |
| 2008/0217088 A1 * | 9/2008 | Berg | 180/233 |
| 2008/0283326 A1 | 11/2008 | Bennett et al. | |

* cited by examiner

MULTIPLE USE ALL TERRAIN VEHICLE

CROSS-REFERENCE TO RELATED APPLICATION(S)

This application claims priority as a divisional application under 35 U.S.C. §121 of earlier filed application Ser. No. 12/649,842 entitled "MULTIPLE USE ALL TERRAIN VEHICLE" by James Bergman, et al. and filed Dec. 30, 2009, which is hereby incorporated by reference. This application claims the benefit of provisional application No. 61/203,905, entitled "Multiple Use All Terrain Vehicle" filed Dec. 30, 2008, which is hereby incorporated by reference.

BACKGROUND

The present application relates to personal off-road vehicles. More particularly, the application discloses a personal off-road vehicle, commonly referred to as an all terrain vehicle, with improvements geared towards applications for military, law enforcement, and emergency personnel.

Over the last several years, the popularity of all terrain vehicles (also referred to as "ATVs") has greatly increased. ATVs are practical and versatile, as the vehicle may be used for work or leisure related tasks. The compact nature, mobility, and traction, of ATVs means the vehicles are capable of traversing all sorts of surfaces, from the relatively smooth surfaces of paved roadways to rough, uneven terrains, including rocky areas, woodland trails, wetlands, and sand dunes. ATVs are also typically designed to pull or push various objects such as a trailer or a snow-plow.

A typical ATV is a straddle-type personal vehicle. Such a vehicle comprises four or more wheels mounted to a frame, the front wheels being steerable. A fuel tank and a seat are disposed on an upper portion of the frame. The engine, which represents one of the heaviest components of the vehicle, is typically mounted in a central portion of the vehicle, usually below the fuel tank and a front portion of the seat. The engine location is specifically chosen to ensure a proper weight distribution. If the engine is water cooled, a radiator will be provided in front of the engine.

While such a configuration provides vehicles with performance levels that are more than adequate, there are nonetheless many disadvantages associated with it. For example, if the vehicle is to be used for special utility purposes, or by emergency personnel or military personnel, additional vehicle storage, stability, and utility are required from what is typically found in a standard model known in the art.

SUMMARY

In one embodiment, an all terrain vehicle having a frame and a footrest having a receiver portion adapted to mate with the frame, wherein the footrest includes a mechanism that aids in removal of the footrest from the frame is disclosed.

In an alternate embodiment, a footrest assembly for an all terrain vehicle containing a frame is disclosed. The assembly has a footrest support attached to the frame, a removable footrest, a receiver attached to the footrest and configured to mate with the footrest support, and a locking mechanism attached to the receiver to secure the removable footrest with respect to the footrest support.

In another embodiment, an all terrain vehicle with a tool less maintainable drive system, and a seat designed to be straddled by the operator, is disclosed. The vehicle has a frame, a plurality of wheels attached to the frame, a steering mechanism attached at least one of the plurality of wheels, an engine mounted to the frame, and a clutch attached to the engine. The vehicle contains a system of features that can be removed without the use of tools. The system has a support attached to and extending outward from the frame, a removable footrest, a receiver attached to the removable footrest and configured to mate with the support, a locking mechanism attached to the receiver to secure the removable footrest with respect to the footrest support, and a removable clutch housing.

DETAILED DESCRIPTION

Figure 1:
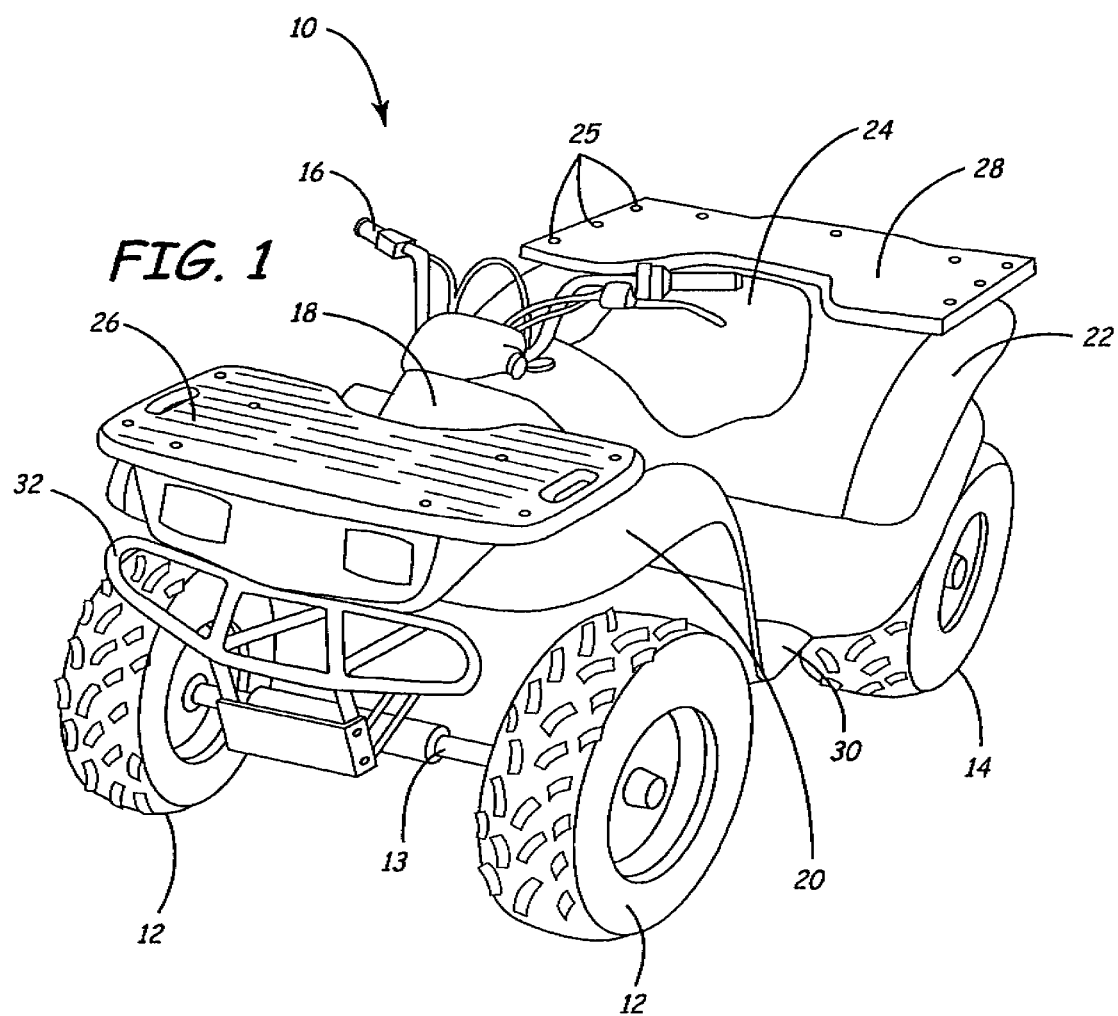
FIG. 1 is a perspective view of a typical ATV.

FIG. 1 is a perspective view of a typical ATV 10. ATV 10 has four wheels, including two front wheels 12 and two rear wheels 14, with front wheels 12 capable of being steered with handlebar 16 by the ATV operator. Front wheels 12 and rear wheels 14 are each attached to respective front axle 13 and rear axle (not shown). Wheels 12, 14 and axles are part of a drive train system. Each axle is mounted on a suspension system relative to the vehicle frame. The frame supports an engine which actuates the drive train system. Main body portion 18 covers the frame which holds the engine and drive train system. Common elements of main body portion 18 include side front fender 20 and side rear fender 22, and seat 24 for the ATV operator.

Other elements of ATV 10 include various support structures, such as front rack 26, rear rack 28, footrest 30 on each side of seat 24 between side front fender 20 and side rear fender 22, and front grill 32. Other optional support structures not show include a front hood, a rear cargo box, and a roll cage. Front rack 26 and rear rack 28 are positioned atop front fender 20 and rear fender 22, respectively, and are mounted to the frame of the ATV 10 by a plurality bolts that extend through holes 25. Front grill 32 may further act as a brush guard to protect the engine. Front grill 32 is constructed of metal tubing and is attached to the frame of ATV 10. Similarly, each footrest 30 is also attached to the frame of ATV 10.

Figure 2:
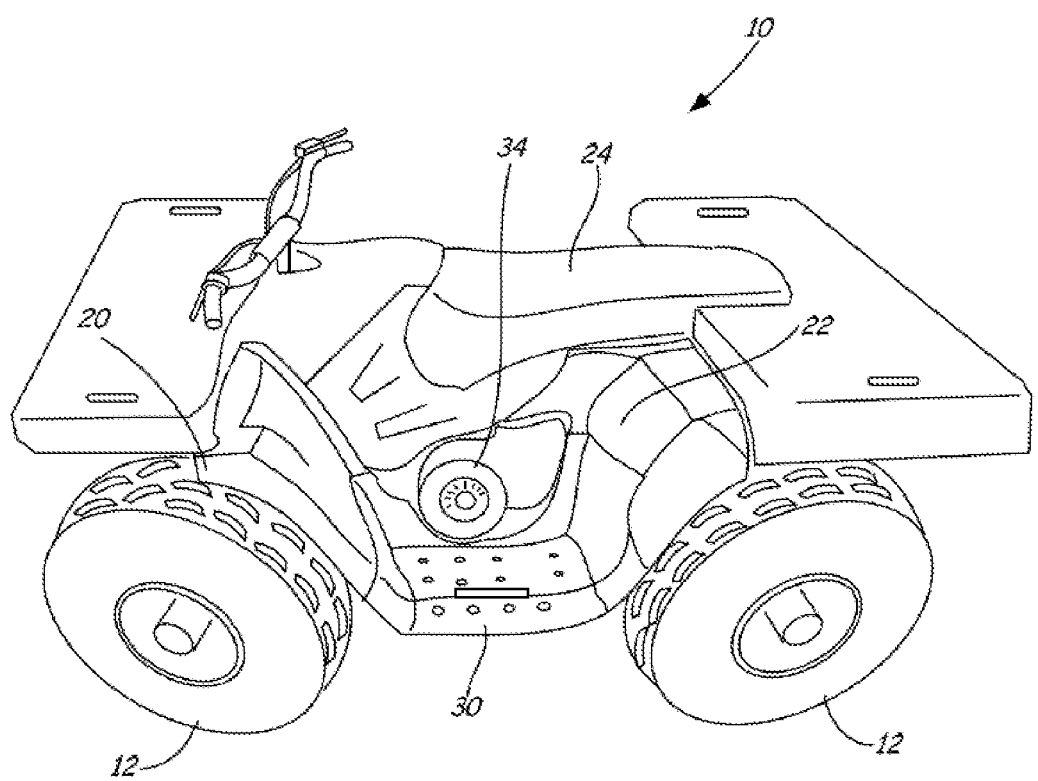
FIG. 2 is a side view of an ATV illustrating a footrest and clutch cover.
Figure 2B:
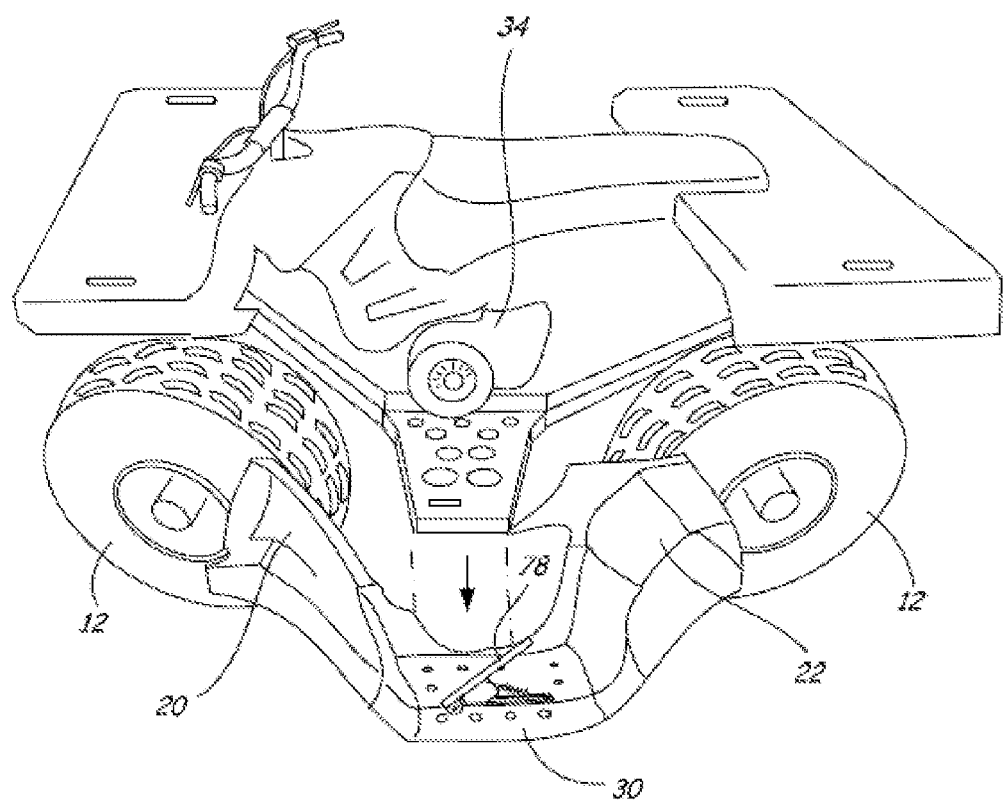
FIG. 2B is a side view illustrating the footrest and clutch cover.
Figure 2C:
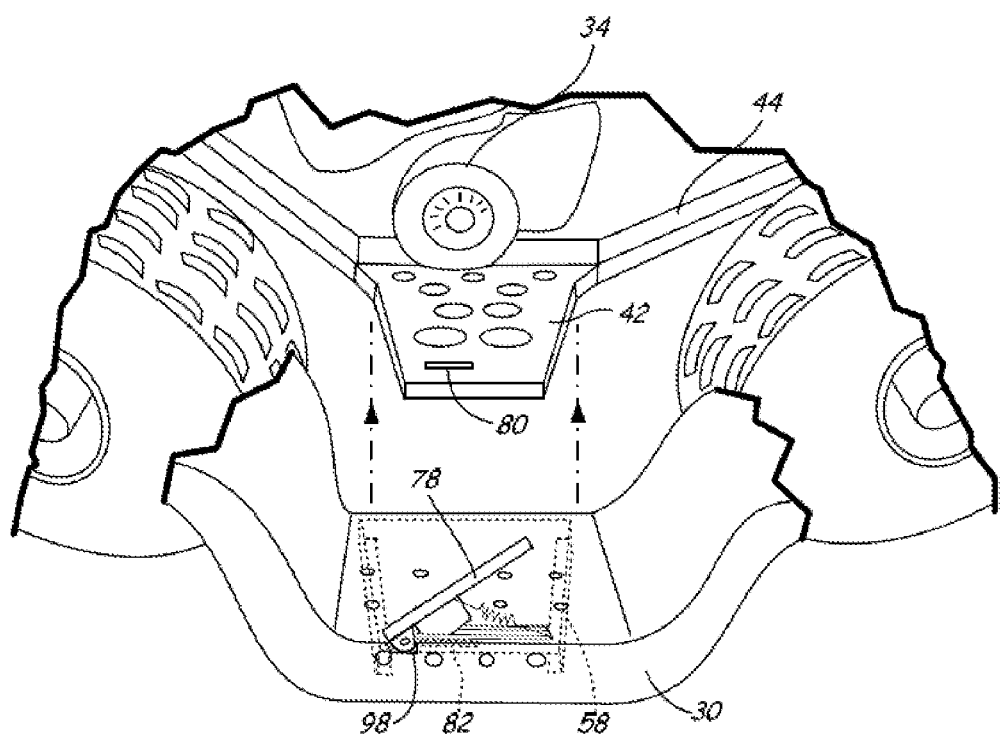
FIG. 2C is a perspective view illustrating the footrest and clutch cover.

FIG. 2 is a side view of ATV 10 illustrating seat 24, wheels, 12, 14 footrest 30 between side front fender 20 and side rear fender 22, and clutch cover 34 adjacent engine 36. Footrest 30 is attached to side front fender 20 and side rear fender 22 with fasteners 38. Side front fender 20, side rear fender 22, and footrest 30 are all constructed from a lightweight plastic material such as high density polyurethane (HDPE), ABS, or similar thermoplastic material. Side front fender 20 and side rear fender 22 provide extra protection to a seated operator on ATV 10 from material being tossed by wheels during operation of ATV 10. The fenders 20, 22 prevent the operator of ATV 10 from coming into contact with gravel, mud, or other debris that gets kicked up from wheels 12, 14 during operation of ATV 10.

Figure 3:
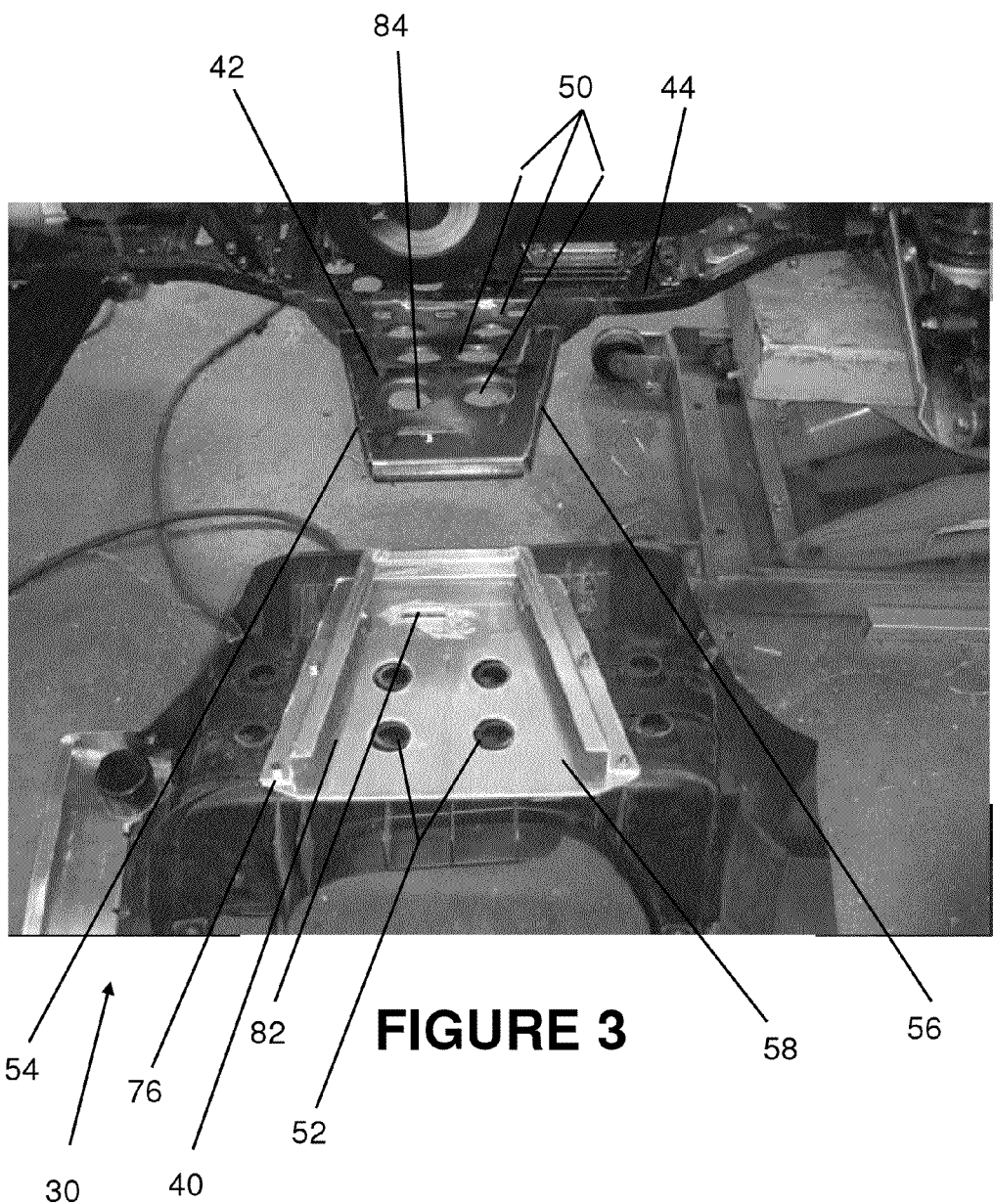
FIG. 3 is a perspective view of the bottom side of the footrest, and a footrest support attached to the frame of the ATV.

FIG. 3 is a perspective view of bottom side 40 of footrest 30, and footrest support 42 attached to frame 44 of ATV 10. Footrest support 42 is a metal piece of material that is attached to frame 44 of ATV 10. The embodiment illustrated, footrest support 42 contains tapered edges towards the outer edge of ATV 10. Footrest support 42 contains a plurality of holes 50. Holes 50 provide multiple functions, including decreasing weight of the vehicle, as well as providing traction or tread for the operator's foot when footrest 30 has not been installed.

When footrest 30 is not installed, footrest support 42 can act as a place for the operator of ATV 10 to place a foot securely away from the moving parts of the vehicle. Footrest support 42 is constructed from a lightweight rigid material, such as aluminum, or any other suitable rigid material including other metals, alloys, thermoplastics, and the like. Footrest support 42 is capable of supporting the weight of the operator plus the weight of footrest 30 and any attachments thereto including side fenders 20, 22. If footrest support 42 is constructed from metal, it is attached to frame 44 of ATV 10 through a process such as welding. Alternately, footrest support 42 may be secured through a bracket that uses fasteners to attach it to frame 44 of ATV 10.

In the embodiment illustrated, footrest support 42 contains front edge 54 and rear edge 56 angled towards one another from frame 44 of the vehicle outward. Front edge 54 and rear edge 56 may also contain tapered sides or chamfered edges to promote easy installation of footrest 30 with receiver 58 (See FIGS. 4 & 5). As illustrated, footrest support 42 is generally trapezoidal in shape. This design is an improvement over the prior art, which typically has the footrest attached to a single tube, which is dangerous for the operator to utilize as a place to rest the foot as the area is provided is extremely small. Other prior art vehicles contain two post that extend from the frame. This design also is difficult for the operator to find a save and secure area to place the foot during operation of the vehicle.

Figure 4:
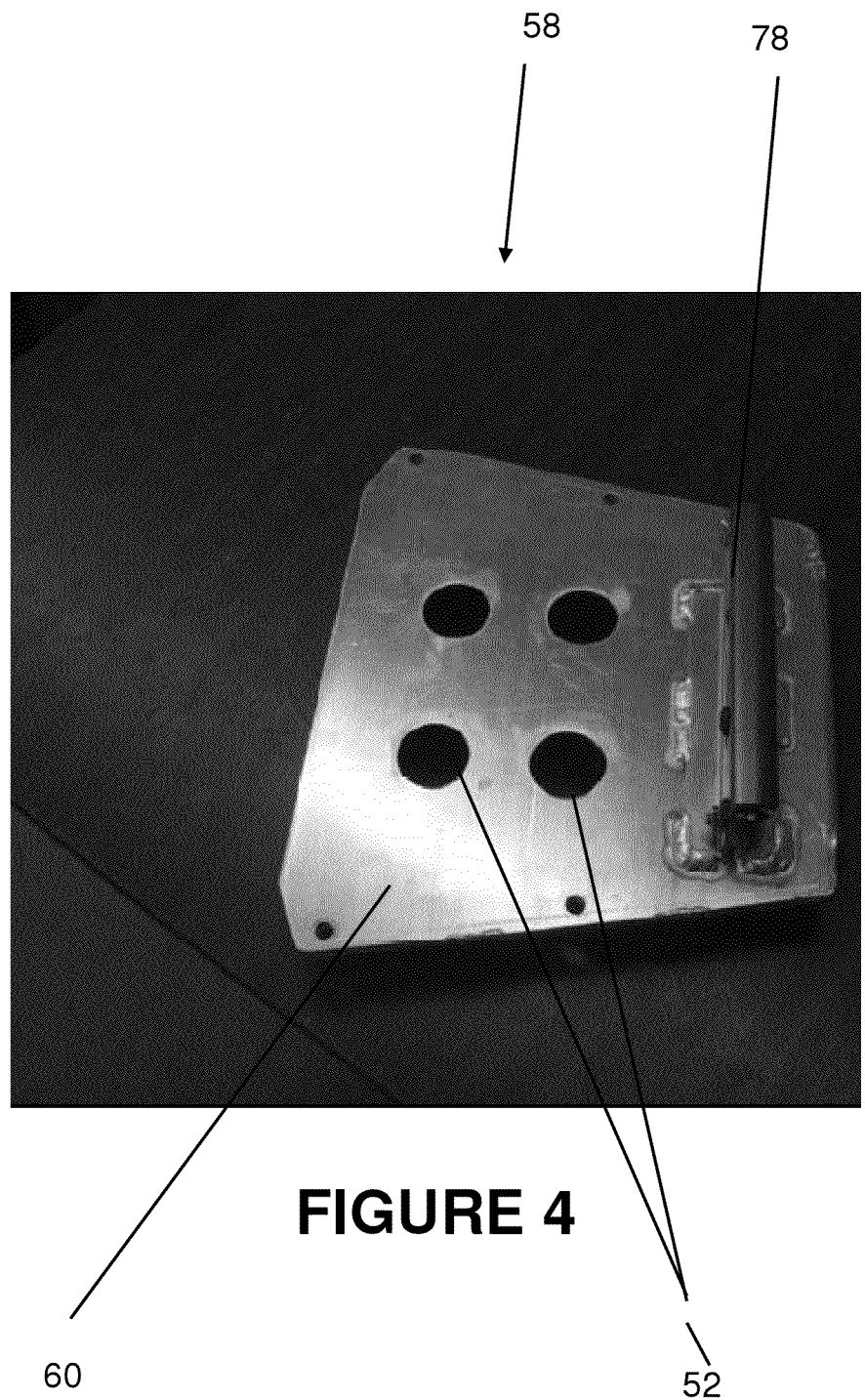
FIG. 4 is a top view of a receiver connected to the footrest.
Figure 5:
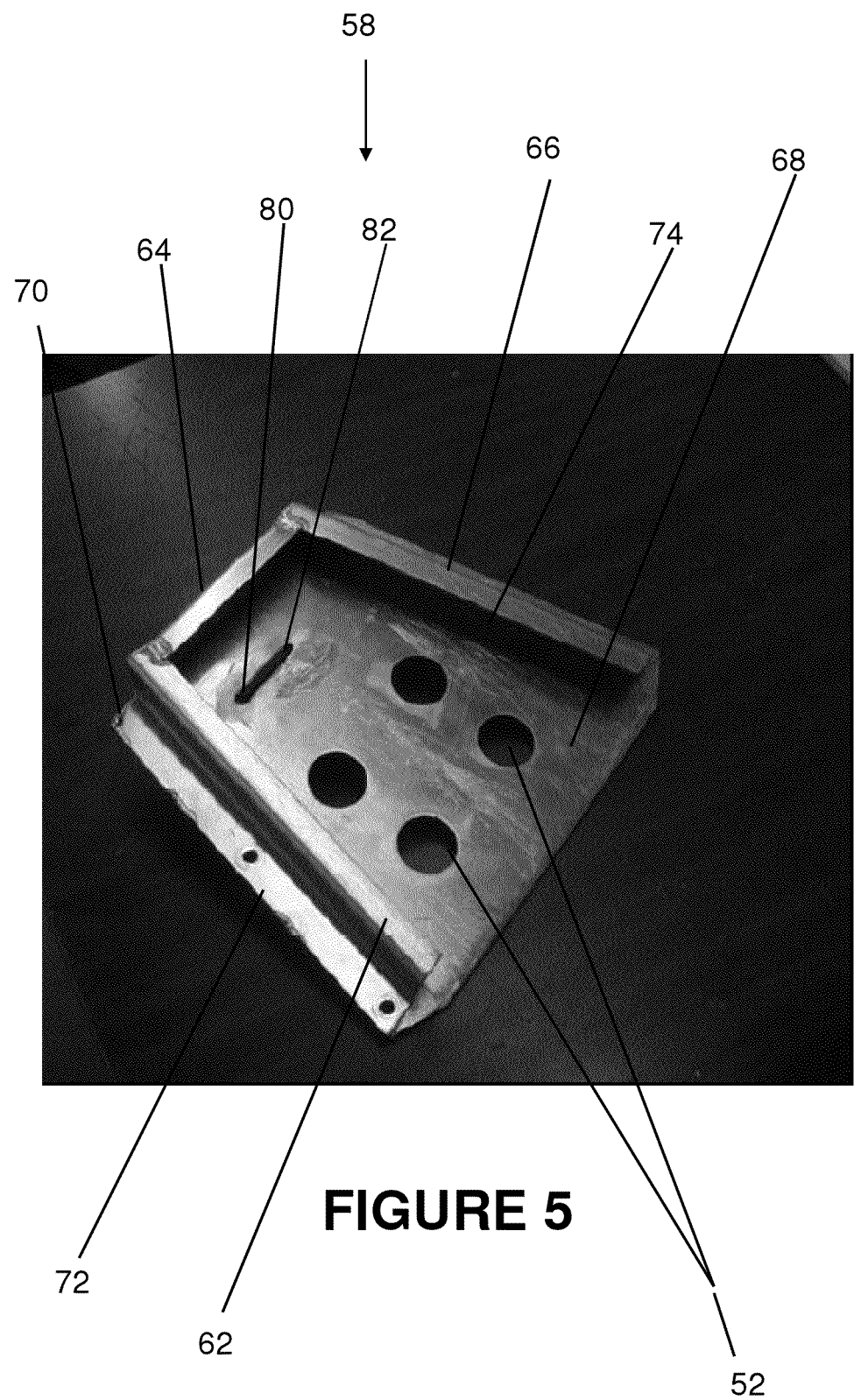
FIG. 5 is a bottom view of the receiver.

FIG. 4 is a top view of receiver 58 of footrest 30. FIG. 5 is a bottom view of receiver 58. As illustrated, top surface 60 of receiver is a flat plate that contains a series of holes 52. These holes 52 again reduce weight of the vehicle as well as allow for communication through footrest 30 to allow open communication between the top and bottom of footrest 30, and to act as tread for footrest 30. Holes 52 allow for water and debris to drain from the operator's lower limbs onto the ground to prevent a buildup of material on footrest 30. Holes 52 align with holes 50 on footrest support 42.

As illustrated in FIG. 5, receiver 58 contains three L-shaped brackets extending from bottom surface 68. L-shaped brackets 62, 64, 66 are disposed on outer edge 70, and front and rear sides 72, 74 of receiver 58 to create a mating channel for footrest support 42. In an alternate embodiment, receiver 58 is a tubular channel that mates with footrest support 42. Receiver 58 is secured to the bottom of footrest 30 through a plurality of fasteners 76 (See FIG. 3). In an alternate embodiment, if footrest 30 is constructed from a lightweight metal or alloy, receiver may be secured directly thereto by welding, or may be formed integrally with footrest 30 by a process such as insert injection moulding.

Top side 60 of the plate of receiver 58 also contains lever 78. Lever 78 is attached to position tab 80 that is used to hold footrest 30 in place once receiver 58 is placed over footrest support 42. In one embodiment, lever 78 is a spring-loaded, actuated handle that can either be pivotable from one end, or may be pulled directly in one direction by an operator to actuate a spring in tension as receiver 58 is placed over footrest support 42. Lever 78 is then released to snap position tab 80 in place. Lever 78 is attached to position tab 80 that extends through slots 82, 84 in receiver, footrest, and footrest support. This configuration allows for a quick installation of footrest 30 onto the vehicle. The spring-loaded lever 78 with operator handle allows for a quick release of footrest 30, while the tapered front, rear sides 54, 56 allow for a quick release of the components, i.e., receiver 58 on footrest 30 from footrest support 42. This design is especially useful in cold weather climates, where ice buildup and snow often interfere with operating and locking mechanisms. With the current design, once the handle is actuated, the unit is released, and the shape, i.e., the tapers in sides, promotes easy actuation so the operator can pull footrest 30 and any attached assembly components away from frame of ATV 10, which will release and allow removal of footrest 30 and attached assembly components from ATV 10.

Figure 6:
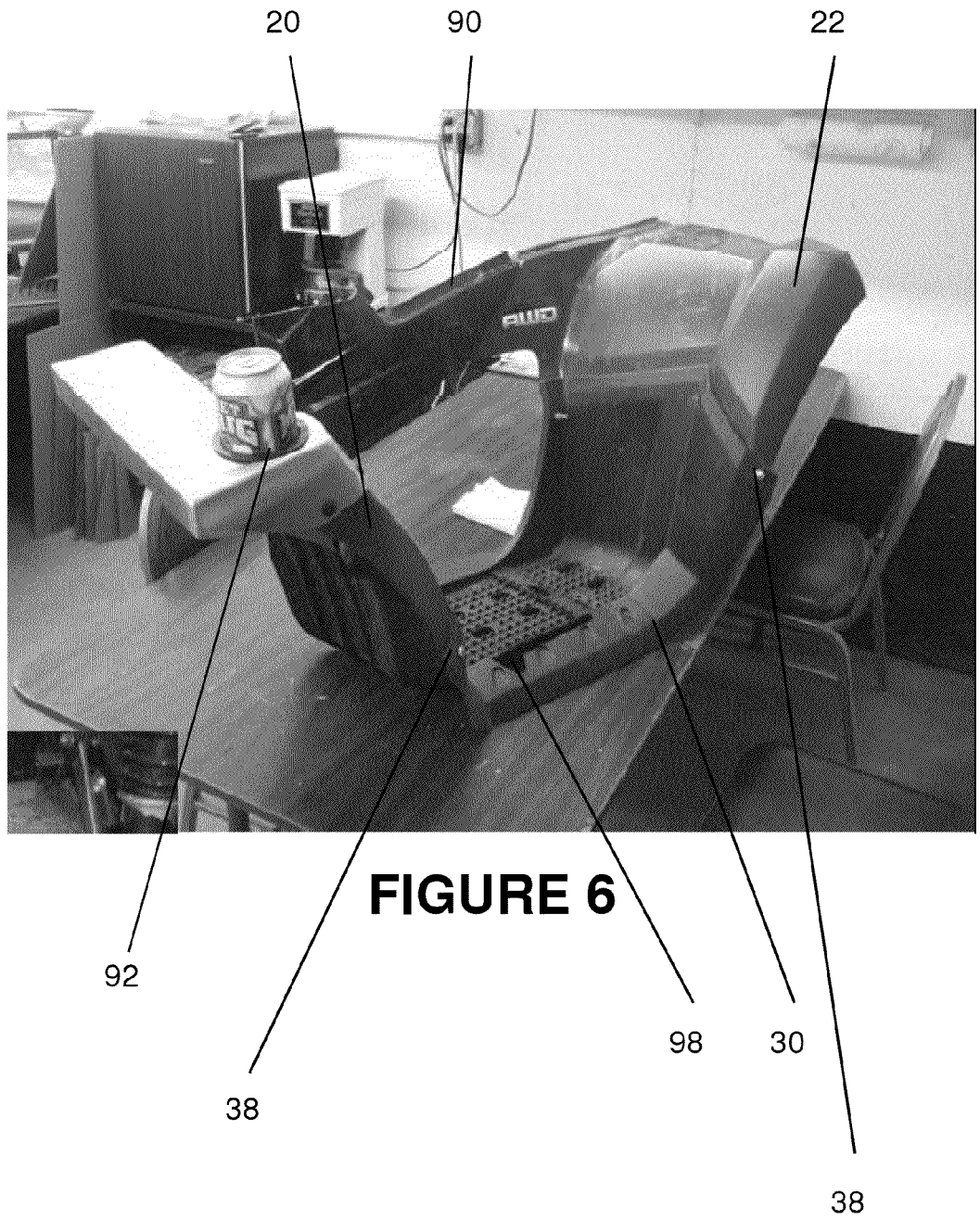
FIG. 6 is perspective view of the footrest with fenders attached thereto.

FIG. 6 is a perspective view of footrest 30 with fenders 20, 22, 90 attached. Aside from front fender 20, and rear side fender 22, also attached between side fenders is central fender portion 90. Front and rear side fenders 20, 22 are attached to footrest 30 with fasteners 38. In an alternate embodiment, the entire footrest and fender assembly is manufacture as a single piece. Fenders 20, 22, 90 may take any various size and shapes, and may include other accessories such as storage compartments, or beverage container holder 92. The removable side panel constructed from fenders 20, 22, 90 and footrest 30 with receiver 58 aids in the reduction of maintenance time, while still providing fender structure and support for the ATV. In one embodiment, quick release locking pins or similar tool-less fasteners known in the art may be utilized to further secure the fenders to other portions of the vehicle, such as the frame, dash, or seat.

Figure 7:
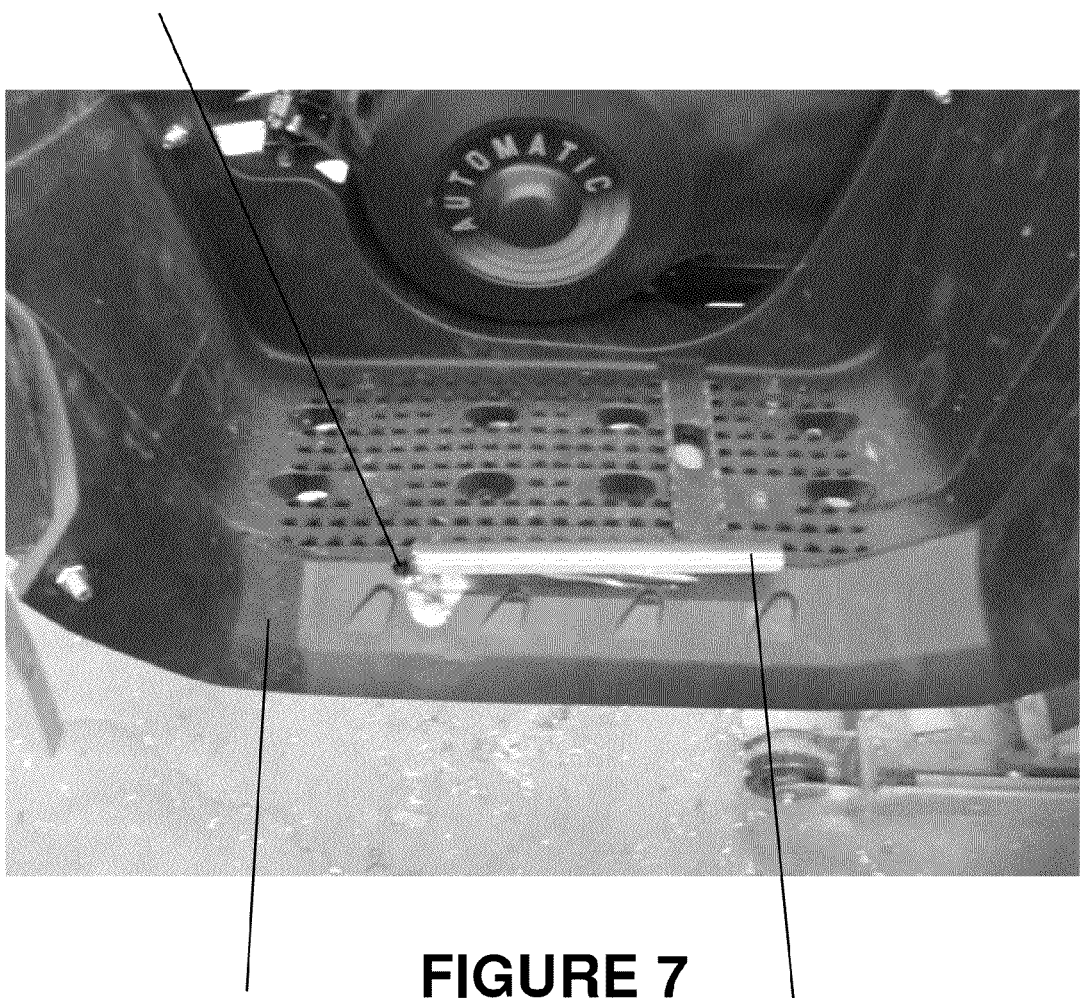
FIG. 7 is a perspective view of the footrest with a lever extending through a slot therein.
Figure 8:
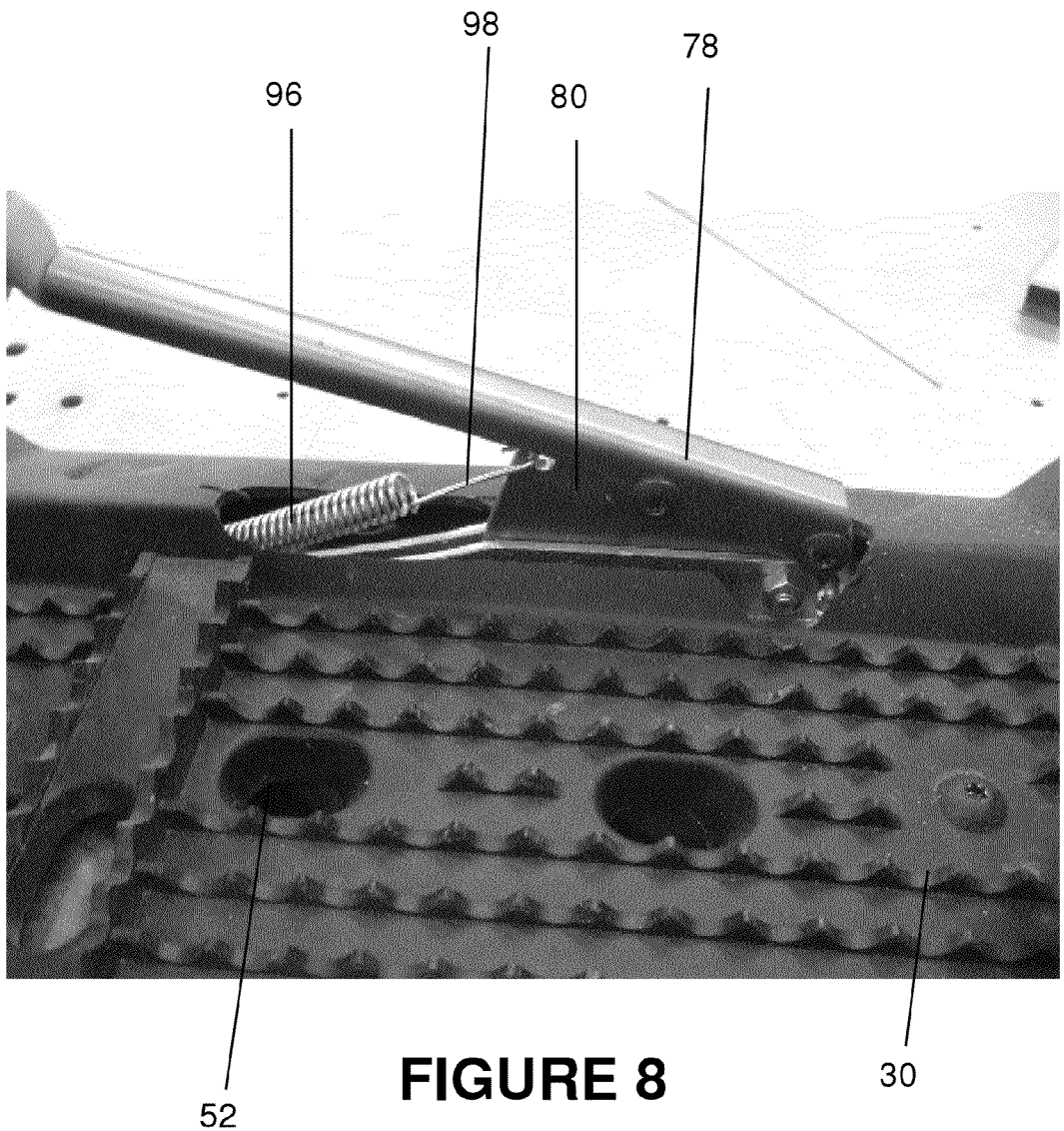
FIG. 8 is a perspective view from the opposite side as FIG. 7, and illustrates the lever in the release position.

FIG. 7 is a perspective view of footrest 30 with lever 78 extending through slot 98. FIG. 8 is a perspective view from the opposite side as FIG. 7, and illustrates lever 78 in the release position. As illustrated, lever 78 is a rod that is pivotally attached to receiver 58 and has tab 80 connected adjacent the pivot. Spring 96 is attached to lever 78 adjacent the end of tab 80 opposite the pivot point, and additionally is attached to receiver 58. Spring 96 is in tension in the release position, and will compress to hold tab 80, and thus secure footrest 30 to footrest support 42. Slot 98 is fabricated in footrest 30 to allow free movement of lever 78 and spring 96. The handle of lever 78 extends past the length of slot 98 when lever 78 is in the closed position, and a portion of footrest 30 acts as a stop for lever 78. Footrest 30 contains a series of treads for the foot of the operator. Footrest 30 also has a raised outer rib, which acts as extra support as well as creates a secure area for the operator to place a foot on footrest 30.

Figure 9:
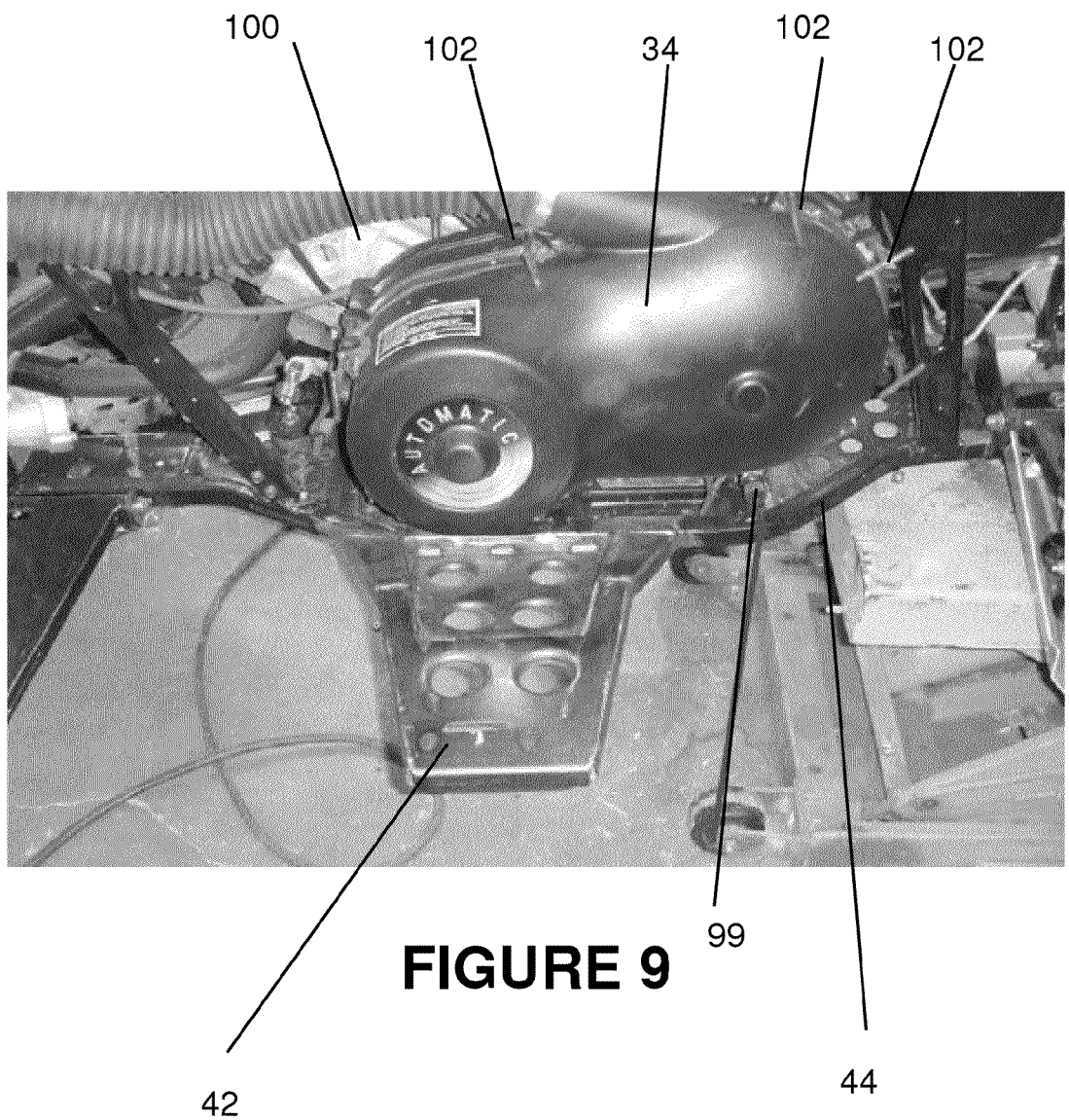
FIG. 9 is a side view of the ATV with the clutch cover and footrest support.
Figure 10:
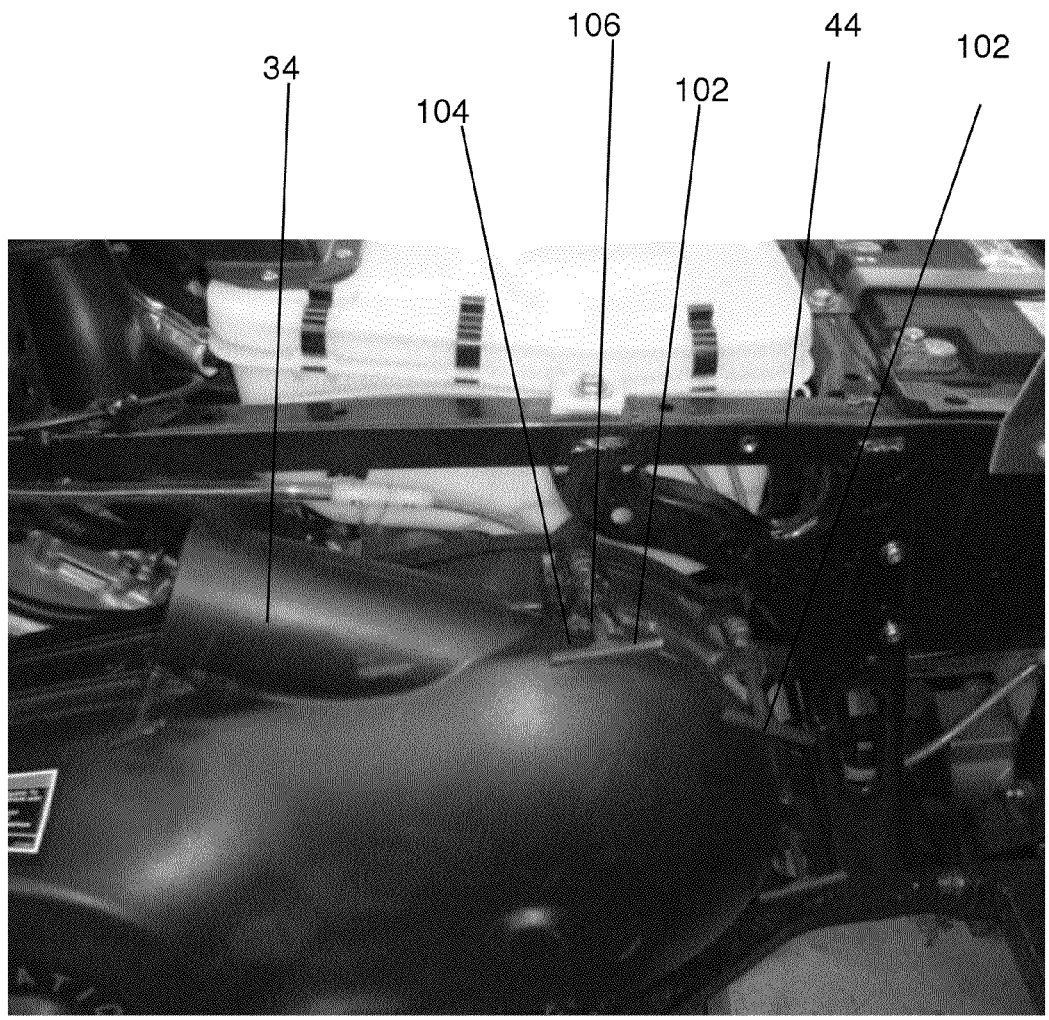
FIG. 10 is a magnified perspective view of the rear portion of the clutch cover illustrating the fasteners.

FIG. 9 is a side view of ATV 10 with clutch cover 34, frame 44, engine 100, and footrest support 42. FIG. 10 is a close-up of the rear portion of clutch cover 34 illustrating fasteners 102. Clutch cover 34 is part of a housing that protects the vehicle clutch and acts to draw and control exhaust removal from engine 100. In the embodiment illustrated, clutch cover 34 is made to be easily removable for maintenance of the clutch (combined with clutch cover 34). Clutch cover 34 also contains liquid dumping valve 99, which allows for the removal of liquids that may accumulate in the housing created by clutch cover 34 and other components attached to the vehicle.

To facilitate easy removal of clutch cover 34, a plurality of quick release fasteners 102 are secured around the perimeter of clutch cover 34. In one embodiment, fasteners 102 are spring-loaded pin clips, while on another embodiment, fasteners 102 are operated with a cam mechanism. In an alternate embodiment, fasteners 102 are threaded rods, and frame 44 of ATV 10 contains a plurality of nuts secured there too. Fasteners 102 contain T-shaped handles 104 that extend from the securing mechanism of fastener 102. Handles 104 allows an operator to easily grasp and remove fasteners 102. In alternate embodiments, fasteners 102 contain an extension portion 106 connected to an ergonomic handle 104. Extension 106 places handle 104 past clutch cover 34, and allows the operator to grasp handle 104 and pivot or rotate handle 104 to release fasteners 102 free from interference of the vehicle housing including clutch cover 34. Fasteners 102 are made of materials known in the art for such devices, such as plastics, metals, or alloys.

Figure 11:
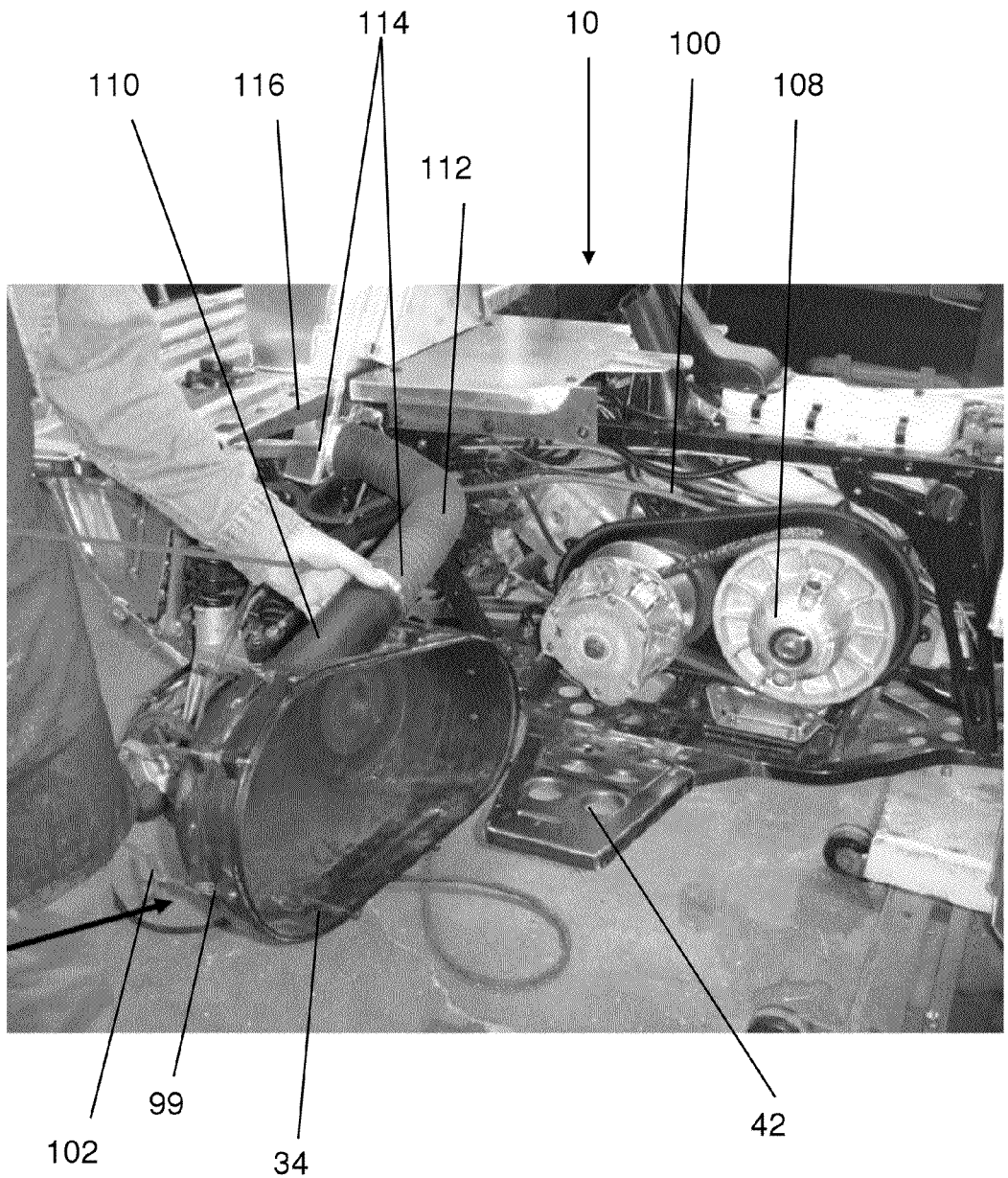
FIG. 11 is a perspective view illustrating the removable clutch cover, footrest support, and clutch of the ATV.

FIG. 11 is a perspective view illustrating removable clutch cover 34, footrest support 42, clutch 108, engine 100, and frame 44 of ATV 10. As illustrated, clutch cover 34 has been removed exposing the mechanics of clutch 108. Clutch cover 34 is comprised of a lightweight metal, or is formed from a thermal plastic material. Fasteners 102 are secured to clutch cover 34 on extension portion 106 to prevent losing fasteners 102 once clutch cover 34 has been removed. Clutch cover 34 contains hose connection portion 110 connected to flexible hose 112, which is secured by hose clamps 114. Flexible hose extends towards an air inlet/outlet 116 to allow airflow into clutch cover 34 to cool the components contained therein and/or to remove exhaust from engine 100. Flexible hose is fabricated from materials known within the art, such as temperature resistant rubber.

With clutch cover 34 removed, an operator can access clutch 108 components therein. Clutch cover 34 contains water dumping valve 99, which allows for release of fluids that may build up in the housing once clutch cover 34 is installed. With the current design, no additional tools need to be carried in the field to access clutch 108, and the belt that drives clutch 108 can be easily accessed and replaced. Thus, a tool-less replacement of the clutch belt may be done in the field. Tool-less, replacement for maintenance of clutch 108 is important in time-critical situations, such as when utilizing ATV 10 in emergency capacity or in a military combat setting. Flexible hose 112 prevents removal of the clutch absent disconnection of flexible hose 112 from either clutch cover 34 or air inlet/outlet 116. Air inlet/outlet 116 attached to flexible hose 112 exhausts adjacent the dash. In colder weather, the vehicle exhaust fan engine 100 may be directed towards the operator to provide warm air to the area adjacent the operator.

Figure 12:
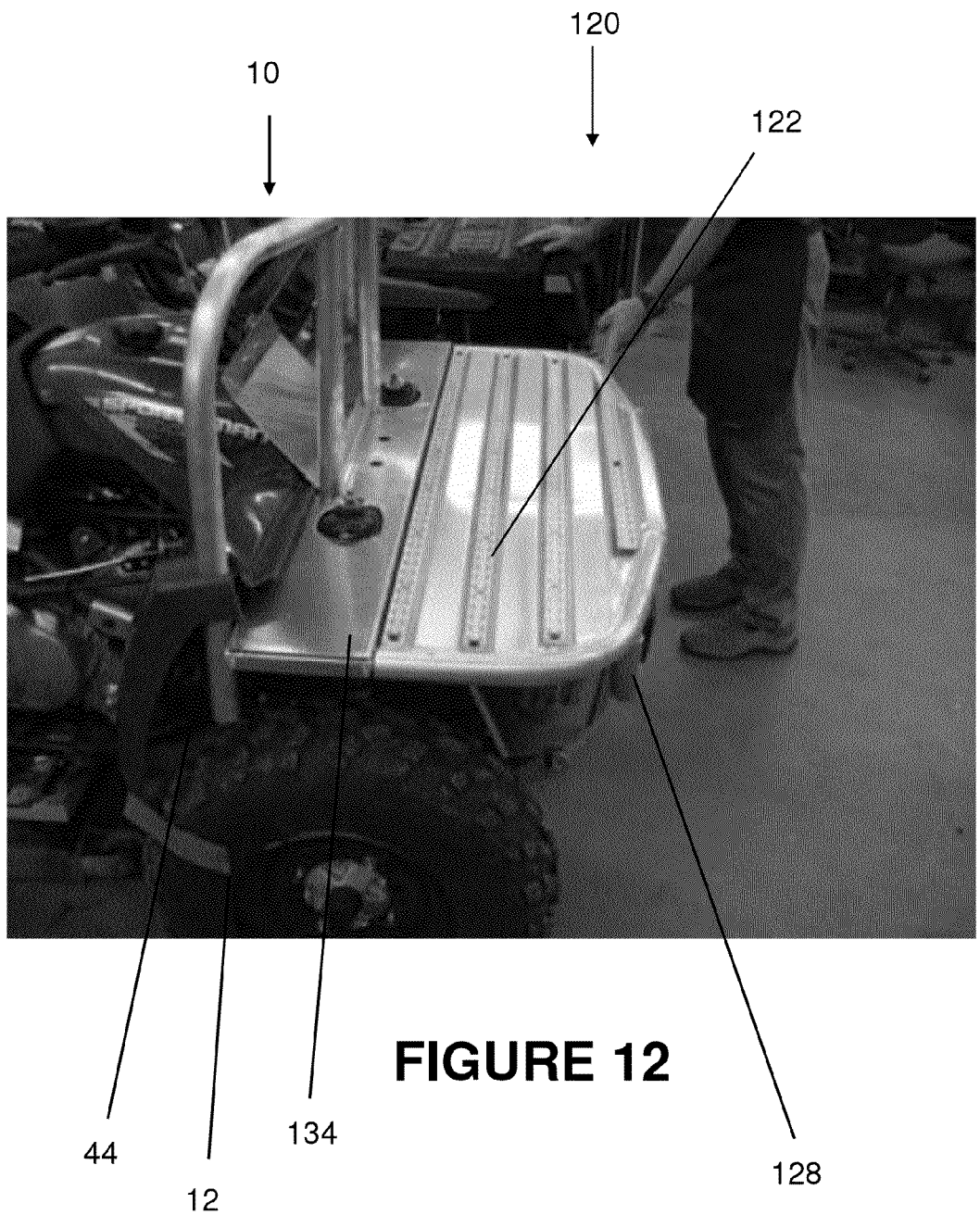
FIG. 12 is a perspective view of the front bumper and brush guard combination assembly.
Figure 13:
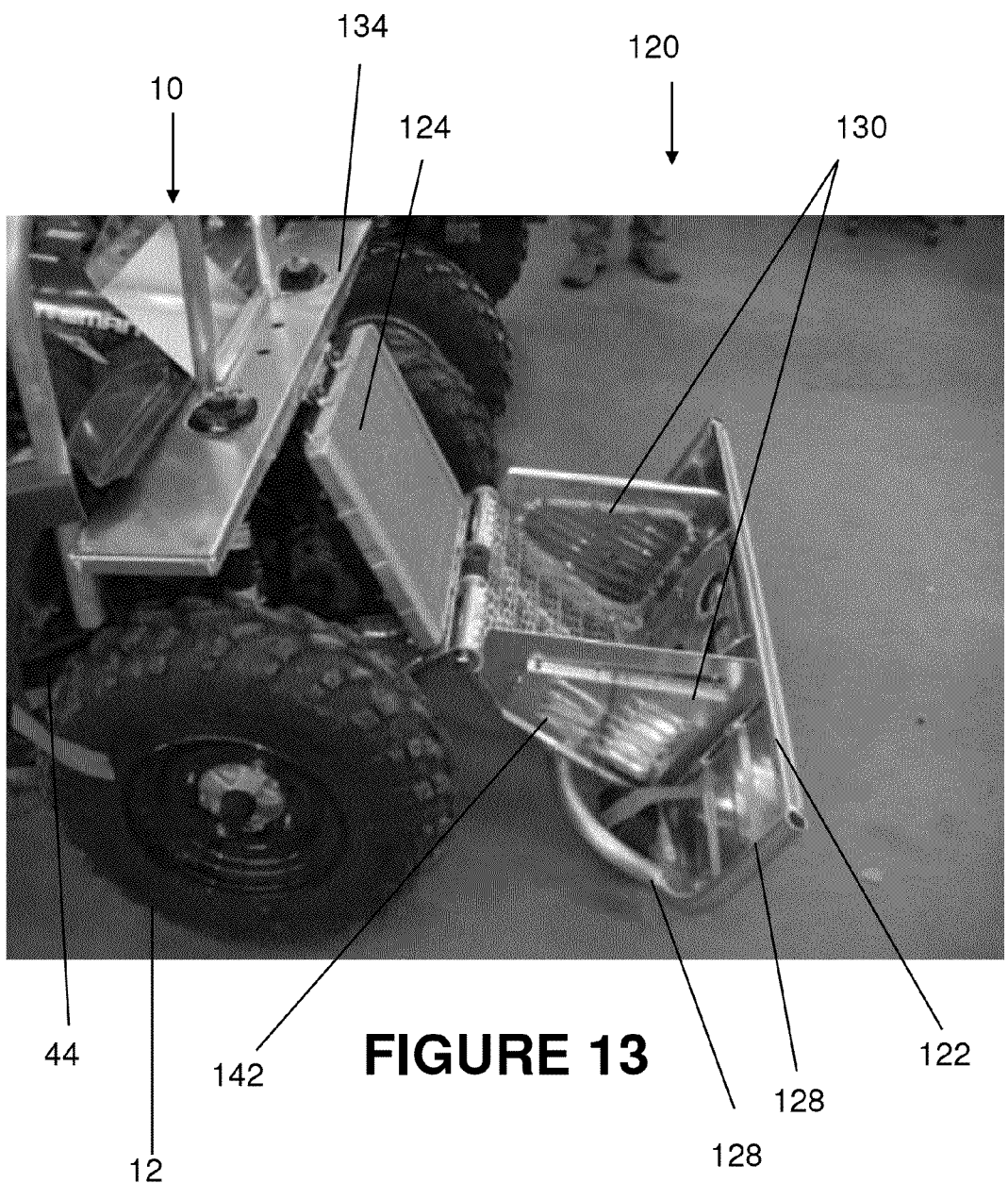
FIG. 13 is a perspective view of the combination bumper assembly in an open position.

FIG. 12 is a perspective view of the front bumper and brush guard combination assembly. Combination bumper assembly 120 contains rack portion 122 that allows for a storage area on ATV 10. In one embodiment, rack 122 contains a fastening system, shown as slotted rails that interact with corresponding pins, for securing cargo carried on the front rack of the vehicle. FIG. 13 is a perspective view of combination bumper assembly 120 in an open position. In this view, wheels 12 are connected to frame 44 of ATV 10, with radiator 124 at the front of the vehicle. Combination bumper assembly 120 is attached to the front of the vehicle at the lower end of radiator 124 that allows for detachment of combination bumper assembly 120.

Figure 14:
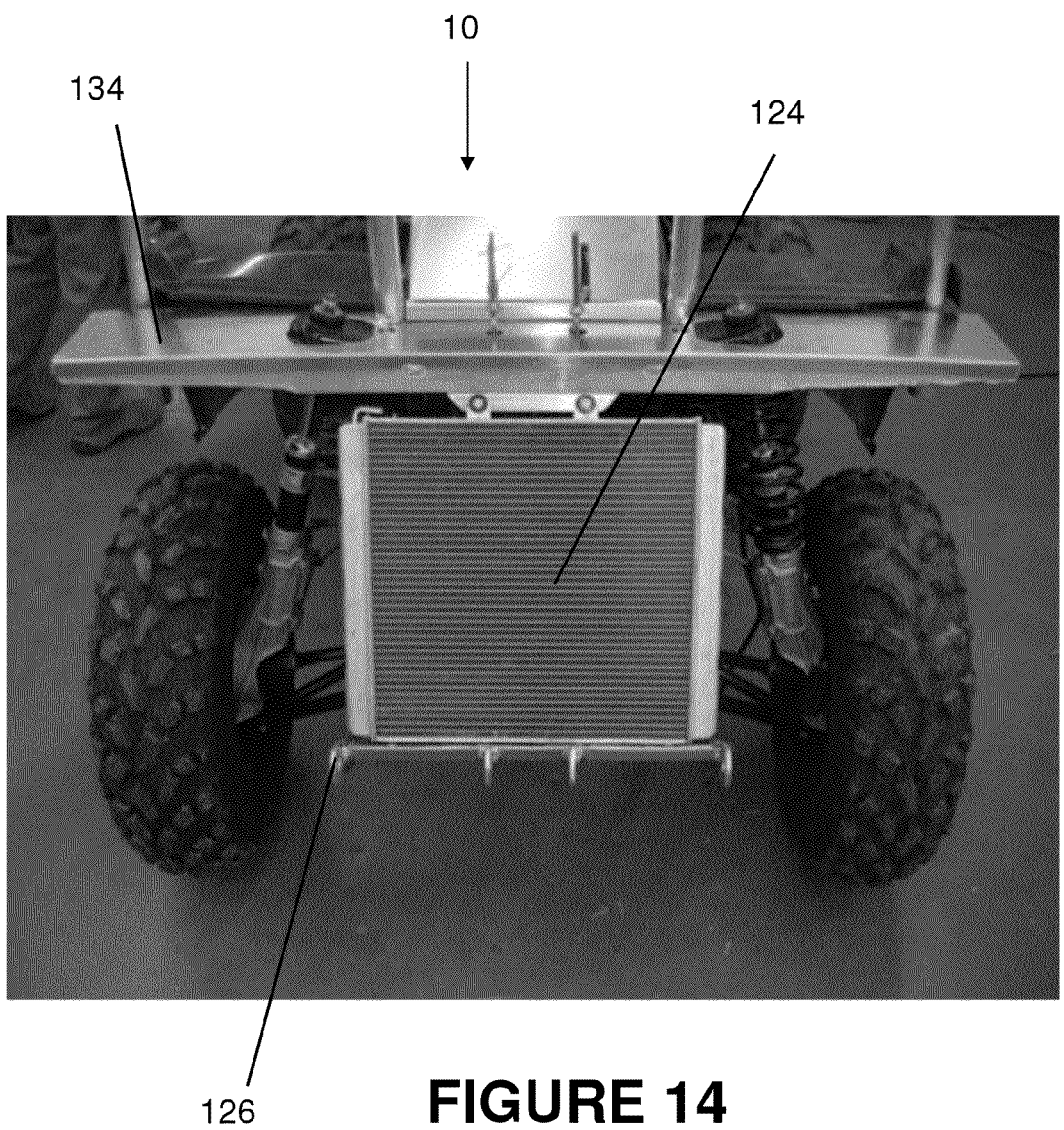
FIG. 14 is a front view of the ATV with the bumper assembly removed.

FIG. 14 is a front view of ATV 10 with bumper assembly 120 removed. In this view, bracket 126 is attached below radiator 124 that allows for a quick detachment of the bumper assembly. Again referring to FIG. 12, combination bumper assembly 120 contains bumper tubes 128 on the front end, a flat surface that acts as rack 122, and two side panels 130 that help create a protected area for radiator 124. Side panels 130 on the front of the bumper assembly 120 contain louvers 142, perforations, or similar structures designed to allow air to flow in, but prevent other debris from entering the enclosed space created when construction bumper assembly 120 is in the closed position. The entire assembly is made from a lightweight, rigid material known in the art such as aluminum or titanium. Bumper 128 acts to protect the vehicle from impact with other objects, and side panels 130 protect radiator 124 from any debris that may be kicked up from wheels during operation of ATV. Combination bumper assembly 120 is hinged to the lower part of the vehicle via bracket 126, which allows the operator to rotate the assembly down to access radiator 124 and other accessories when placed in the area.

Figure 15:
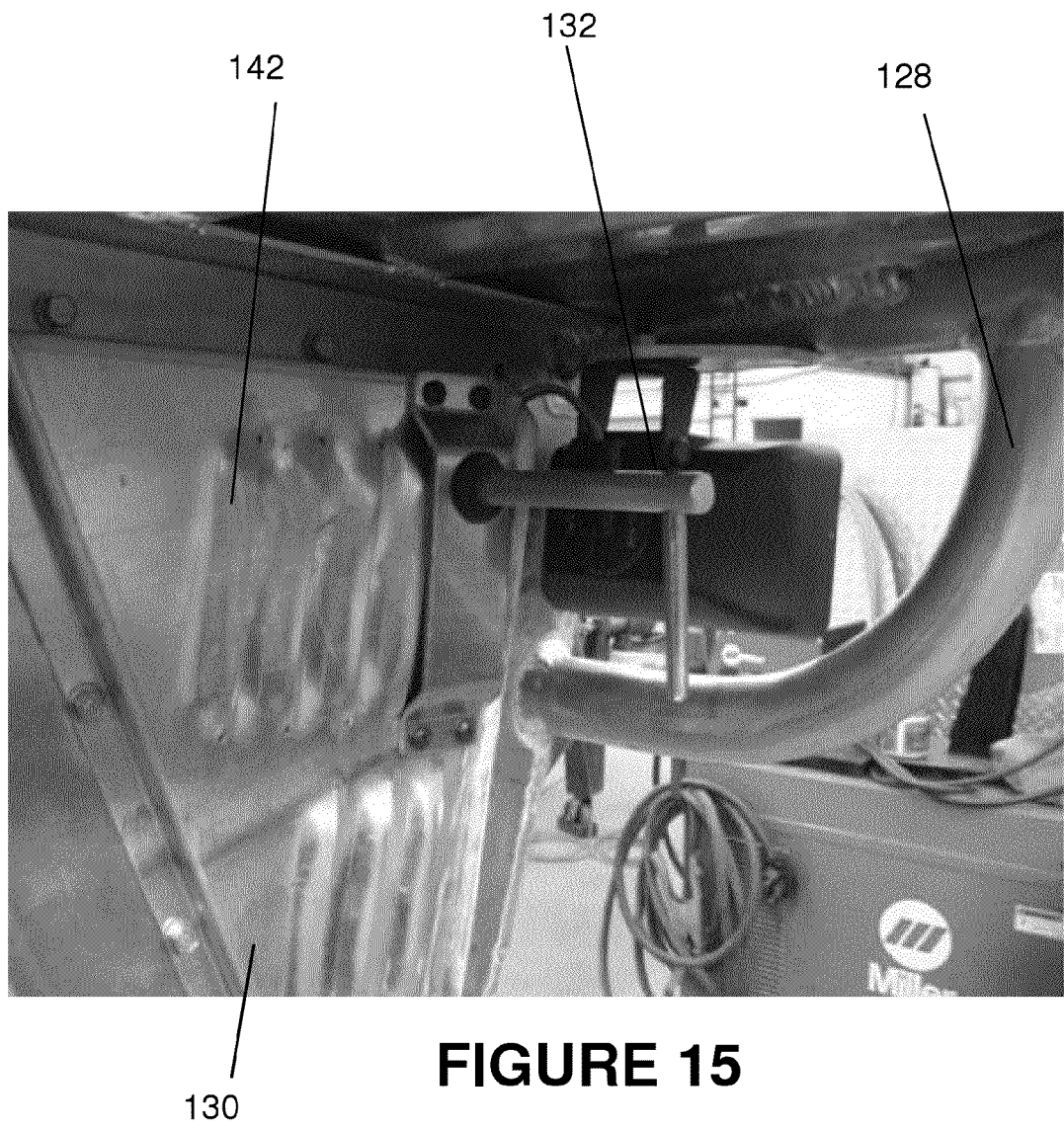
FIG. 15 is a perspective view of the side panel of the bumper assembly with a handle that extends through the side panel.

FIG. 15 is a perspective view of side panel 130 of the assembly and bumper tube 128 as illustrated, handle 132 extends through side panel 130. This allows the operator of the vehicle to access and operate accessories in the enclosed area created from combination bumper assembly 120. Handle 132 allows access to accessory without the use of tools, when bumper assembly 120 is in the closed position. Requiring tools on the vehicle would add extra weight to the vehicle out in the field.

Figure 16:
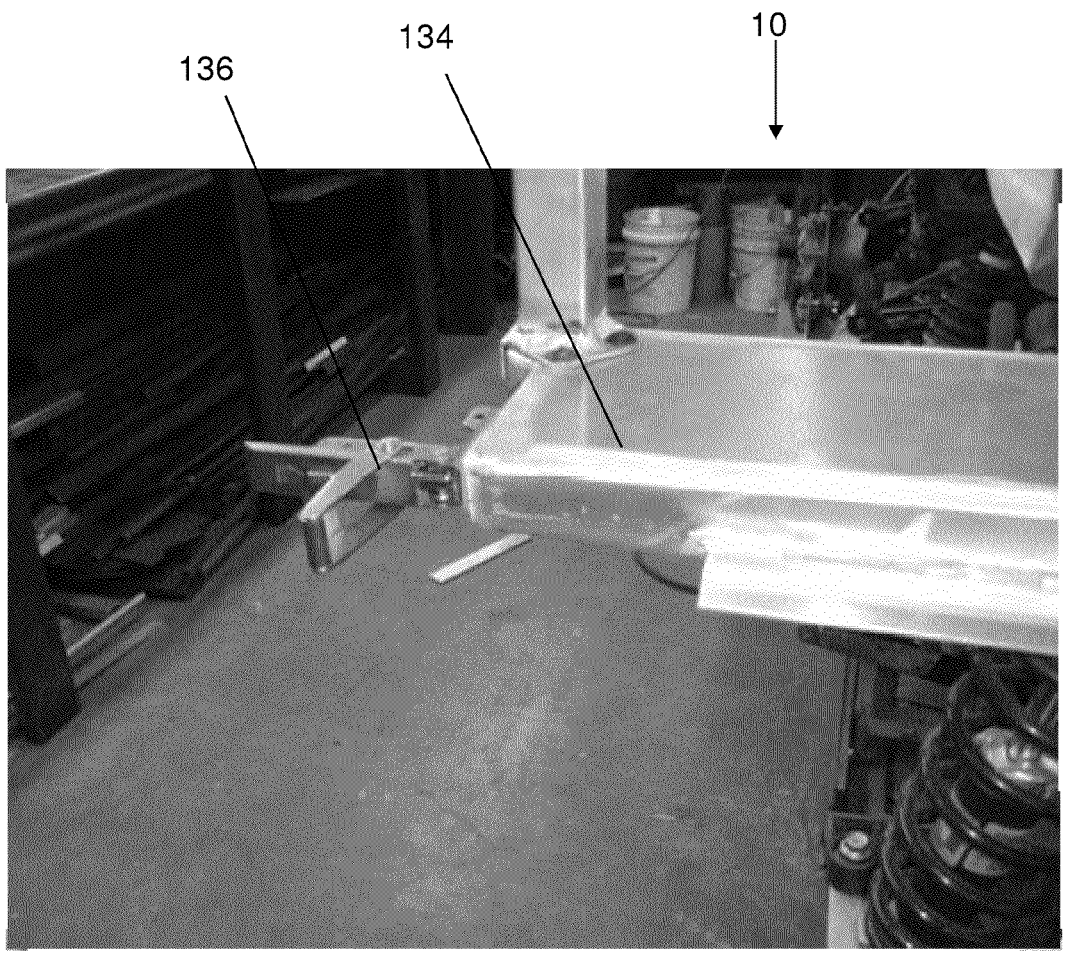
FIG. 16 is a front view of a portion of the front dash of the ATV.
Figure 17:
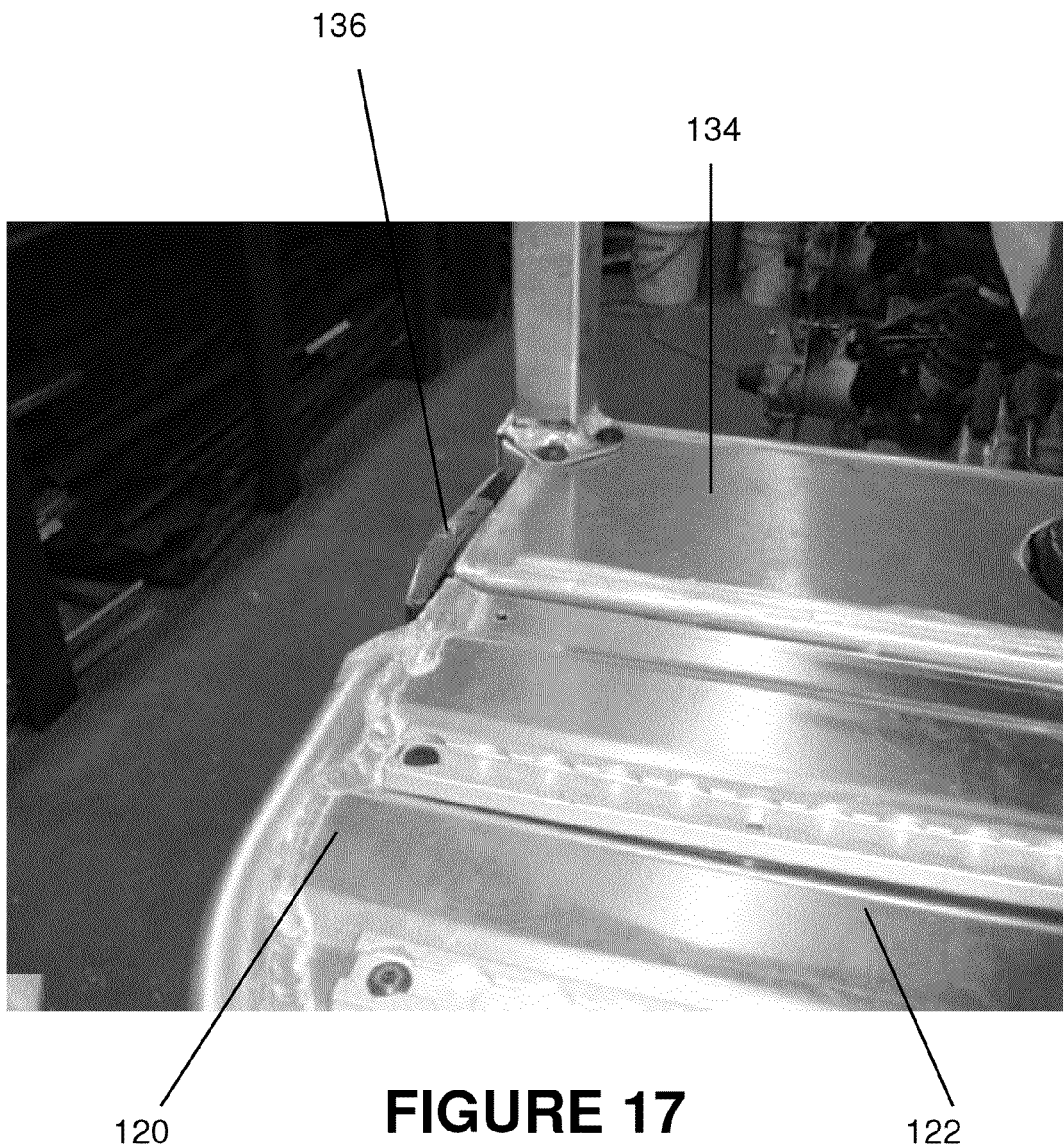
FIG. 17 is a perspective view illustrating the bumper assembly in the closed position secured by a clamp fastener.

FIG. 16 is a front view of a portion of front dash 134 of ATV 10. A clamp fastener 136 or latch is attached to the outer edge of dash. FIG. 17 is a perspective view illustrating bumper assembly 120 in the closed position secured by clamp fastener 136. Clamp fasteners 136 exist on each side of dash 134, and are used to secure combination bumper assembly 120 in place. Clamp fasteners 136 are recessed to prevent accidental opening or catching on debris during operation of the vehicle.

By releasing clamp fasteners 136, combination bumper assembly 120 may be rotated down to allow access to radiator 124. The bottom of bumper assembly 120 is attached to bracket 126. In one embodiment, bumper assembly is attached with a single pin that is secured on one end with a clamp, cotter pin, or similar spring pin. In an alternate embodiment, a couple of tubes are secured to the lower end of the bumper assembly, and multiple pins are used to secure pivoting bottom of bumper assembly 120 to ATV 10 (See FIGS. 13 and 18). This allows for easy removal of combination bumper assembly 120 if the vehicle needs to be used for an area that is size restrictive, or in areas that require a lighter vehicle.

Figure 18:
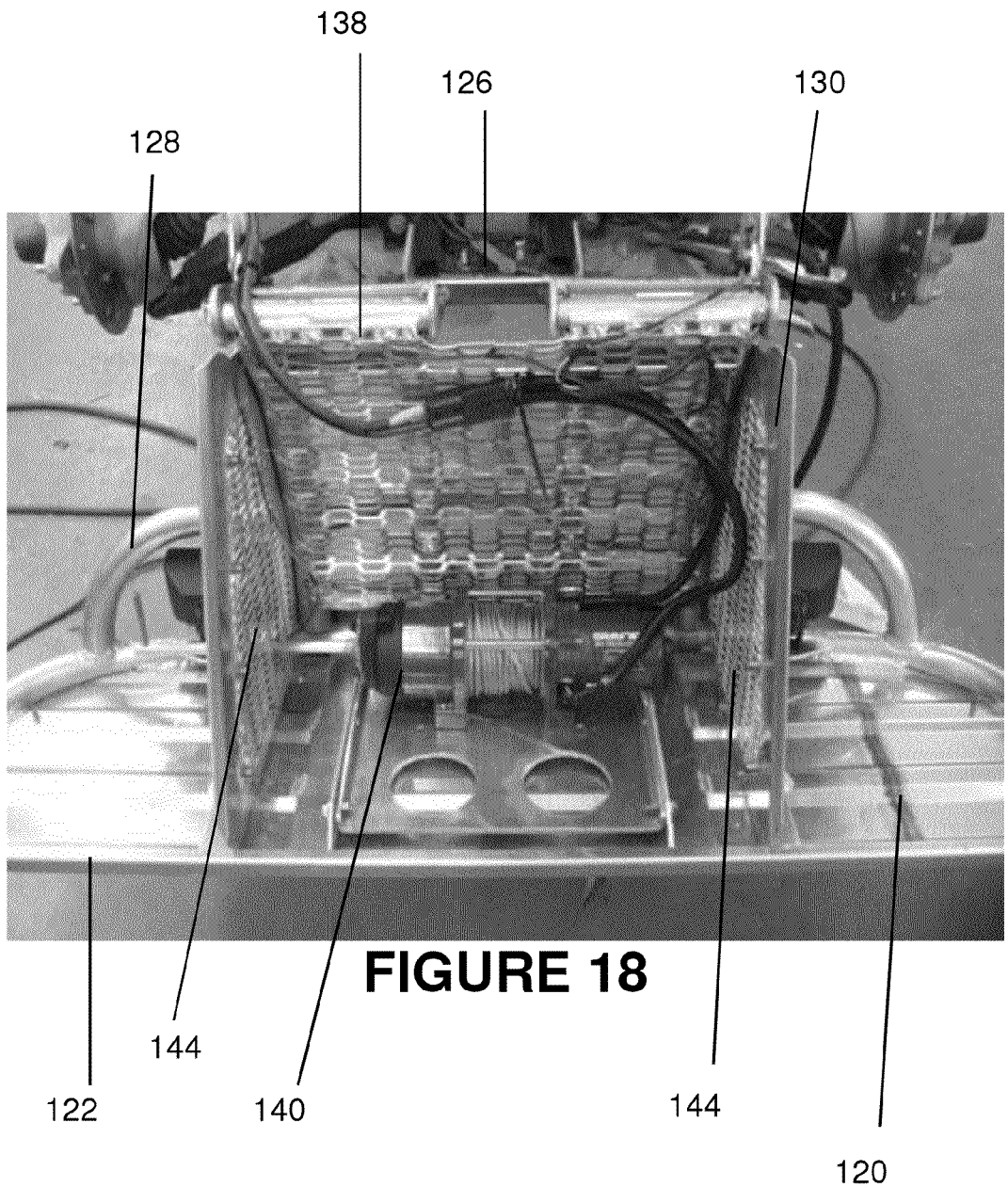
FIG. 18 is a perspective view of an open front bumper assembly.

FIG. 18 is a perspective view of an open front bumper assembly 120. In this view, winch 140 is in place within combination bumper assembly 120. The position of winch 140 in combination bumper assembly 120 protects winch 140 from the elements, and from any debris thrown by the vehicle wheels. The quick release of combination bumper assembly 120 via clamp fixtures 136 allow access to the winch 140, as well as opening the front bumper assembly 120. Winch 140 is designed so that it may be utilized when bumper assembly 120 is closed (See FIG. 15), or maybe utilized when bumper assembly 120 is in open position. In one embodiment, winch 140 may contain extension handle 132 to operate winch 140 when combination bumper assembly 120 is in the closed position, effectively hiding and protecting winch 140.

Winch 140, as well as any other electrical accessories that may be contained within combination bumper 120 assembly such as headlights, contain quick disconnect couplings for the wiring to assure quick and easy removal from the vehicle of combination bumper assembly 120. Front grill 138 of the assembly contains a screen of several undulating bends and a forward portion with two generally flat type portions. This structure protects radiator 124 from debris encountered while operating the vehicle. The undulations or corrugations in the front screen of front grill 138 increase surface area, increase component stiffness, and improve component strength. Combination bumper assembly 120 also contains two side panels 130, each panel containing a series of outer louvers 142. Louvers 142 increase air flow towards the radiator during operation of the vehicle, while at the same time preventing other foreign material from collecting in the radiator (See FIG. 15). As an extra precaution, side panels 130 may also include screens 144 on the respective inner sides thereof. The quick access design of combination bumper assembly 120 allows the operator to perform maintenance such as cleaning of the fins of radiator 124 (FIG. 14).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An all terrain vehicle having a seat designed to be straddled by the operator, the vehicle comprising:
    a frame;
    a plurality of wheels attached to the frame;
    a steering mechanism attached to at least one of the plurality of wheels;
    an engine mounted to the frame; and
    a front bumper assembly pivotally attached to the frame of the vehicle, the front bumper assembly further comprising:
        a bracket attached to the frame of the vehicle;
        two side panels, each side panel contain at least one air flow modification structure;
        a grill attached between the two side panels, the grill containing a series of apertures to allow airflow therethrough;
        a rack with a top surface, a bottom surface, and a back edge, wherein the bottom surface is attached to at least an edge of each of the side panels and an edge of the grill, the back edge aligns with a dash of the vehicle when the front bumper assembly is in a closed position, and the top surface contains a fastening system;
        at least one clamp mechanism, wherein a portion of the clamp is on the dash of the vehicle and a portion is attached to the rack, the clamp being recessed from a profile of the dash and rack;
        a bumper constructed from a plurality of tubes connected to the rack;
        at least one tube mounted to a bottom edge of the grill; and
        a pin extending through the bracket and at least one tube to create a pivotal connection between the bumper assembly and vehicle.

2. The vehicle of claim 1, and further comprising:
    a clutch attached to the engine;
    a support attached to and extending outward from the frame;
    a removable footrest;
    a receiver attached to the removable footrest and configured to mate with the support;
    a locking mechanism attached to the receiver to secure the removable footrest with respect to the support; and
    a removable clutch housing, wherein the clutch housing can be removed without the use of tools.

3. The vehicle of claim 2 further comprising:
    a plurality of tool less fasteners secured around the perimeter of the clutch housing.

4. The vehicle of claim 3 wherein the plurality of fasteners are held on the removable clutch housing with an extension portion.

5. The vehicle of claim 2 further comprising:
    a front fender attached to a front side of the removable footrest;
    a rear fender attached to a rear side of the removable footrest; and
    a side fender extending between the front fender and the rear fender.

6. The vehicle of claim 1 further comprising:
    an accessory mounted within an area created by the side panels, grill, and rack.

* * * * *